US010180834B2

United States Patent
Turner et al.

(10) Patent No.: US 10,180,834 B2
(45) Date of Patent: Jan. 15, 2019

(54) PROVISIONING OF APPLICATIONS DEPLOYED ON CLIENT DEVICES

(71) Applicant: AirWatch LLC, Atlanta, GA (US)

(72) Inventors: Stephen Turner, Atlanta, GA (US); Scott Kelley, Atlanta, GA (US)

(73) Assignee: Airwatch LLC, Atlanta, GA (US)

( * ) Notice: Subject to any disclaimer, the term of this patent is extended or adjusted under 35 U.S.C. 154(b) by 284 days.

(21) Appl. No.: 15/056,243

(22) Filed: Feb. 29, 2016

(65) Prior Publication Data
US 2017/0250977 A1    Aug. 31, 2017

(51) Int. Cl.
| | | |
|---|---|---|
| G06F 8/61 | (2018.01) | |
| H04L 29/08 | (2006.01) | |
| H04L 29/06 | (2006.01) | |
| H04W 12/10 | (2009.01) | |
| H04W 4/50 | (2018.01) | |

(52) U.S. Cl.
CPC ............... *G06F 8/61* (2013.01); *H04L 63/12* (2013.01); *H04L 67/30* (2013.01); *H04L 67/34* (2013.01); *H04W 12/10* (2013.01); *H04W 4/50* (2018.02)

(58) Field of Classification Search
CPC . G06F 8/61; H04L 63/12; H04L 67/30; H04L 67/32; H04L 67/34; H04W 12/10; H04W 4/50
See application file for complete search history.

(56) References Cited

U.S. PATENT DOCUMENTS

| | | | | |
|---|---|---|---|---|
| 5,629,980 A * | 5/1997 | Stefik | ...................... | G06F 21/10 705/54 |
| 7,448,022 B1 * | 11/2008 | Ram | ........................ | G06F 8/00 717/120 |
| 7,730,138 B2 * | 6/2010 | Ballinger | ................ | H04L 67/16 709/206 |
| 8,255,991 B1 * | 8/2012 | Hackborn | ................ | G06F 8/61 713/167 |
| 8,458,765 B2 * | 6/2013 | Aciicmez | ............ | G06F 21/6272 726/1 |
| 8,578,443 B2 * | 11/2013 | Narain | .................. | G06F 21/629 726/1 |
| 2001/0013064 A1 * | 8/2001 | Cox | .......................... | G06F 8/61 709/220 |
| 2003/0079133 A1 * | 4/2003 | Breiter | ..................... | G06F 21/10 713/182 |
| 2003/0084324 A1 * | 5/2003 | Koved | ..................... | G06F 21/53 726/6 |
| 2003/0084325 A1 * | 5/2003 | Koved | ..................... | G06F 21/53 726/6 |
| 2004/0193606 A1 * | 9/2004 | Arai | ....................... | G06F 21/604 |
| 2004/0193917 A1 * | 9/2004 | Drews | ..................... | G06F 21/10 726/17 |

(Continued)

*Primary Examiner* — Joseph P Hirl
*Assistant Examiner* — J. Brant Murphy
(74) *Attorney, Agent, or Firm* — Thomas | Horstemeyer, LLP

(57) ABSTRACT

Disclosed are various examples for deploying applications on client devices through a management service. A client device can be enrolled with a management service. The management service can determine application settings that are associated with an application and generate an application profile for the application. The application profile can be used to deploy the application to client devices and provision the application with the appropriate application settings.

17 Claims, 4 Drawing Sheets

(56) References Cited

U.S. PATENT DOCUMENTS

| | | | | |
|---|---|---|---|---|
| 2005/0039158 A1* | 2/2005 | Koved | G06F 21/53 | 717/100 |
| 2005/0114666 A1* | 5/2005 | Sudia | H04L 9/3236 | 713/175 |
| 2006/0242685 A1* | 10/2006 | Heard | G06F 21/577 | 726/3 |
| 2007/0288989 A1* | 12/2007 | Aarnos | G06F 21/53 | 726/1 |
| 2008/0086614 A1* | 4/2008 | Canis | G06F 21/121 | 711/163 |
| 2008/0270583 A1* | 10/2008 | Gonzalez | G06F 8/61 | 709/222 |
| 2008/0288412 A1* | 11/2008 | Treffers | G06F 21/10 | 705/52 |
| 2009/0049518 A1* | 2/2009 | Roman | H04L 41/0893 | 726/1 |
| 2009/0165078 A1* | 6/2009 | Samudrala, Sr. | G06F 21/604 | 726/1 |
| 2009/0210868 A1* | 8/2009 | Parthasarathy, Sr. | G06F 8/71 | 717/169 |
| 2009/0227274 A1* | 9/2009 | Adler | H04L 63/0272 | 455/466 |
| 2009/0280795 A1* | 11/2009 | O'Shaughnessy | H04M 3/42136 | 455/419 |
| 2009/0300706 A1* | 12/2009 | Ray | G06F 21/604 | 726/1 |
| 2009/0300707 A1* | 12/2009 | Garimella | H04L 63/0823 | 726/1 |
| 2009/0313004 A1* | 12/2009 | Levi | G06F 8/30 | 703/28 |
| 2010/0064341 A1* | 3/2010 | Aldera | H04L 63/102 | 726/1 |
| 2010/0251340 A1* | 9/2010 | Martin | G06F 9/541 | 726/4 |
| 2011/0082900 A1* | 4/2011 | Nagpal | H04W 8/245 | 709/203 |
| 2011/0252240 A1* | 10/2011 | Freedman | H04L 63/02 | 713/169 |
| 2011/0289554 A1* | 11/2011 | Kahandaliyanage | G06F 9/468 | 726/1 |
| 2012/0066287 A1* | 3/2012 | Hajost | G06F 8/71 | 709/203 |
| 2012/0129503 A1* | 5/2012 | Lindeman | H04W 4/001 | 455/414.1 |
| 2012/0167162 A1* | 6/2012 | Raleigh | G06F 21/57 | 726/1 |
| 2012/0210443 A1* | 8/2012 | Blaisdell | G06F 21/12 | 726/27 |
| 2012/0215911 A1* | 8/2012 | Raleigh | H04L 12/14 | 709/224 |
| 2012/0216292 A1* | 8/2012 | Richardson | H04W 12/12 | 726/27 |
| 2012/0221955 A1* | 8/2012 | Raleigh | H04M 15/00 | 715/736 |
| 2012/0246484 A1* | 9/2012 | Blaisdell | G06F 21/52 | 713/189 |
| 2012/0246731 A1* | 9/2012 | Blaisdell | G06F 21/53 | 726/26 |
| 2012/0254825 A1* | 10/2012 | Sharma | G06F 8/34 | 717/101 |
| 2012/0303490 A1* | 11/2012 | Hill | G06Q 30/00 | 705/27.2 |
| 2013/0096998 A1* | 4/2013 | Raleigh | G06Q 10/06375 | 705/14.4 |
| 2013/0166899 A1* | 6/2013 | Courtney | G06F 21/53 | 713/100 |
| 2013/0254401 A1* | 9/2013 | Marshall | G06F 21/6218 | 709/226 |
| 2013/0268667 A1* | 10/2013 | Abuelsaad | G06F 21/57 | 709/225 |
| 2013/0283298 A1* | 10/2013 | Ali | G06F 9/5077 | 719/319 |
| 2013/0290709 A1* | 10/2013 | Muppidi, Sr. | H04W 12/08 | 713/168 |
| 2013/0298185 A1* | 11/2013 | Koneru | G06F 15/173 | 726/1 |
| 2014/0282894 A1* | 9/2014 | Manton | H04L 63/102 | 726/4 |
| 2014/0289510 A1* | 9/2014 | Tuch | H04L 63/102 | 713/156 |
| 2015/0378702 A1* | 12/2015 | Govindaraju | G06F 8/61 | 717/177 |

* cited by examiner

PROVISIONING OF APPLICATIONS DEPLOYED ON CLIENT DEVICES

BACKGROUND

Some enterprises provide users with computing devices dedicated to work purposes. These enterprises can impose restrictions on the usage of the issued devices. For example, some companies instruct their employees to refrain from using their work devices for personal uses. In another scenario, an enterprise can implement "bring your own device" (BYOD) policies in which employees are allowed to bring their personal devices to work and to use their personal devices for work purposes. For instance, these companies may allow their employees to use their personal smartphones to access their enterprise's internal networks, email servers, and work files.

To handle this scenario, some device makers and operating systems offer the capability to separate business apps and data from personal apps and data on a device. For example, Android for Work™ is a framework provided by the Android® operating system that allows a user to enroll his or her device with a management service so that the device, or at least certain portions or certain data partitions on the device, can be managed by administrators of the management service. The framework can allow an administrator to configure enterprise profiles for BYOD devices or configure devices that are owned or issued by the enterprise to users. The framework can also provide for remote management of enterprise profiles, applications, and data, as well as provide the ability to remotely alter or delete data on the device without affecting the user's personal applications and data.

Additionally, the framework allows administrators to remotely deploy or install applications onto client devices that are enrolled with a management service of the enterprise. In one example, applications can be deployed by the management service by pushing applications to a user's device along with instructions to install the applications onto the device. In another example, an application can be deployed by the management service by transmitting a command that instructs the client device to retrieve an application from an application distribution system, such as a publicly accessible application marketplace, and install the application onto the user's device. While remotely deploying an application onto a user's device that is enrolled with a management service is possible, determining and configuring the various application settings that can be associated with the application can be a difficult task for an administrator.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
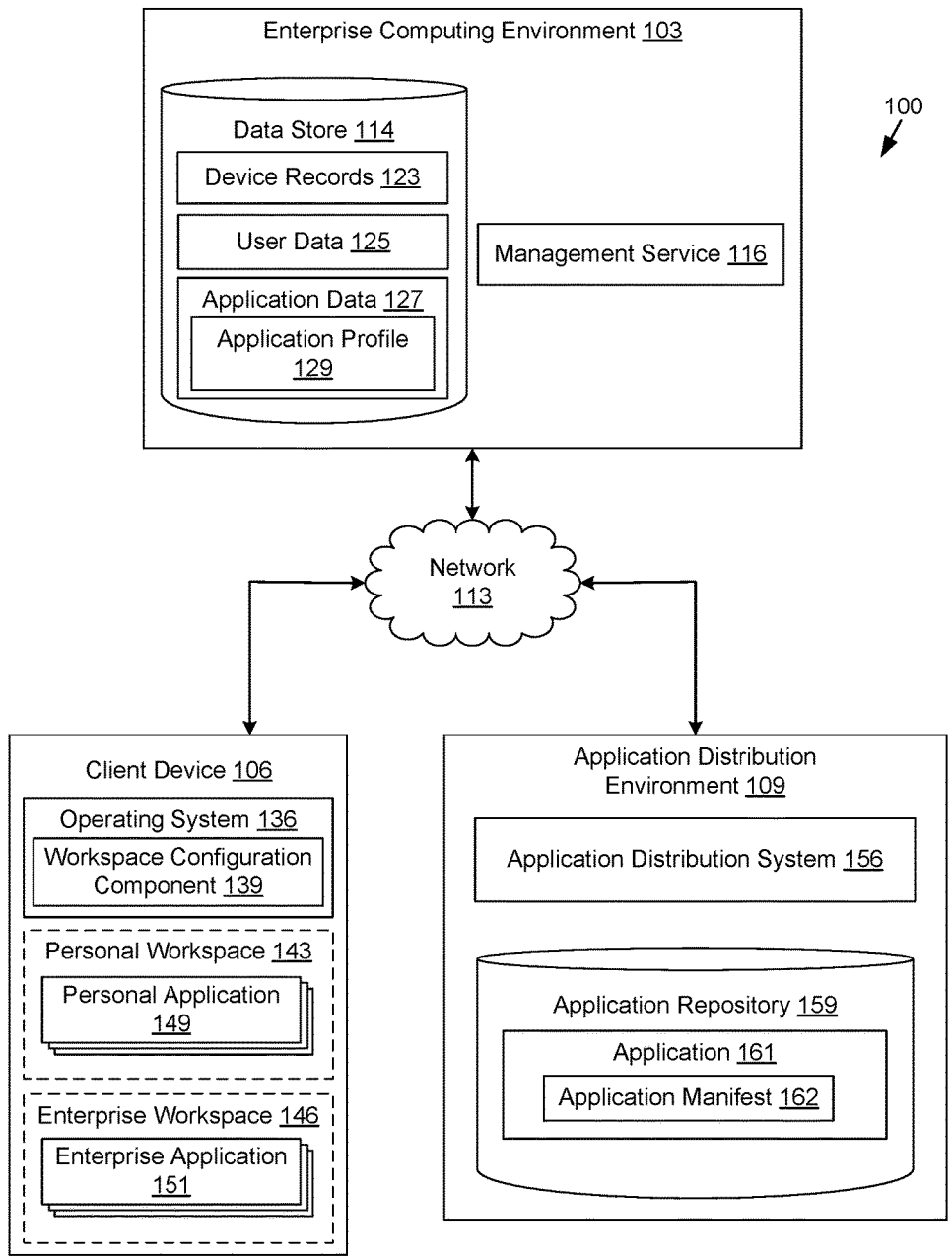
FIG. 1 is a drawing depicting the operation of various examples of the disclosure in a networked environment.

Disclosed are various examples for systems that facilitate dynamic provisioning of applications onto user devices on behalf of an administrator of a management service. As noted above, users of an enterprise can be allowed by the enterprise to use their personal devices to access enterprise resources, such as a corporate network, email, documents, contacts, and other resources. Additionally, an enterprise might have a library of applications that are available for use by its users to access certain data. For example, a particular software-as-a-service (SaaS) tool might create an application to be used to interact with the service. The application can then be made available to users of the enterprise to install on their personal or corporate devices in order to access the SaaS tool.

As described above, an enterprise can implement "bring your own device" (BYOD) policies in which employees are allowed to use their personal devices for work purposes. For instance, these companies may allow their employees to use their personal smartphones to access their company's resources, such as applications that are used for work purposes. Frameworks such as Android for Work™, provided by the Android® operating system, include application programming interfaces (APIs) within the operating system that allow a user to enroll his or her device with a management service. These APIs allow certain portions of the device to be managed by administrators of the management service.

These APIs can also allow an administrator to administer a device owned or issued by the enterprise to a user. For example, an administrator can setup and deploy applications to a device that he or she is preparing to issue to a user using operating system APIs that allow the device to be enrolled as a managed device. In either scenario, an administrator can configure enterprise profiles for BYOD devices or configure devices that are owned or issued by the enterprise to users and deploy applications to the device that are needed by users of the enterprise. The framework APIs can also provide for remote management of the device, which can include the ability to remotely alter or delete data on the device without affecting the personal applications and data of the user.

Administrators for a given enterprise can issue various applications to client devices, whether the client devices are BYOD devices or issued by the enterprise. Additionally, many of the applications might be applications that are made by third parties and that are available from a publicly accessible application marketplace, such as the Apple iTunes App Store® or the Google Play Store®. Operating system APIs can allow the administrator to remotely deploy an application to a client device from a publicly accessible application marketplace, but each deployment of an application can require various settings, preferences, or other data to be associated with an installation of the application for proper functioning of the application. For example, a particular application that is used to access a particular SaaS endpoint might require login information of the user, a security certificate or token to be installed on the client device, server addresses, or other parameters.

Accordingly, administrators might desire provisioning of applications in a way that not only installs the application, but that also configures the application with the various parameters that are needed by a user to use the application. In other words, a desirable user experience might include deploying the application to a client device that is enrolled with a management service along with the settings and parameters that a user might need to use the application so that the user does not have to configure the application with the settings and parameters. Additionally, an administrator of a management service may lack the tools to discover and configure the parameters associated with a specific application.

Examples of the disclosure can analyze an application from an application distribution system and allow an administrator to create an application profile associated with the application. The application profile can include information about various application settings associated with the application as well as the parameters within which the application settings are populated when the application is deployed to a user's device. In this way, an administrator can more easily determine which of an application's settings should be populated on behalf of a user in order to more easily provision an application on a device of the user. Examples of the disclosure can also improve the functioning of an enterprise computing environment that manages the client devices of users by improving the process for provisioning the client devices with applications on behalf of a management service.

FIG. 1 illustrates an example of a networked environment 100 according to examples of the disclosure. In the depicted network environment 100, an enterprise computing environment 103 is in communication with at least one client device 106 and an application distribution environment 109 over a network 113.

The network 113 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 includes a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103 according to various examples. Also, various data can be stored in a data store 114 that can be accessible to the enterprise computing environment 103. The data store 114 can be representative of a plurality of data stores 114. The data stored in the data store 114 can be associated with the operation of the various applications or functional entities described below.

The components executed on the enterprise computing environment 103 can include a management service 116 and other applications, services, processes, systems, engines, or functionality not discussed in detail herein. The management service 116 can be executed in the enterprise computing environment 103 to monitor and oversee the operation of one or more client devices 106. In some examples, the management service 116 can facilitate the administration of client devices 106 by administrators. For instance, the management service 116 can include a management console that generates user interfaces that can allow administrators to operate and interact with the management service 116. The user interfaces can allow an administrator to define policies for a user account or devices associated with an enterprise environment. The user interfaces can also include, for example, presentations of statistics or other information regarding the client devices 106 that can be managed by the management service 116.

Client devices 106 can be enrolled with the management service 116 as fully or partially managed devices. As noted above, operating system APIs provide by a client device 106 can allow the client device 106 to be remotely managed by a management service 116. In this sense, the management service 116 is executed remotely from the client device 106 as well as the application distribution environment 109. The APIs can allow the management service 116 to manage a client device 106 by providing the ability to push profiles, policies, and applications to the client device 106. In some scenarios, such as in the case of a BYOD device, the APIs allow the management service 116 to manage an enterprise workspace of the client device without managing a personal workspace of the client device 106 where a user might store personal data and applications. In some examples, the management service 116 can communicate with the application distribution environment 109 using an API that is provided by the application distribution environment 109 in which API calls can be made over the network 113.

The client device 106 can represent multiple client devices 106 coupled to the network 113. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user. The client device 106, in some cases, can also be a computing device that is considered a BYOD device, or a personal device of a user that the user has enrolled with the management service 116.

The client device 106 can execute an operating system 136 that includes a workspace configuration component 139. The workspace configuration component 139 includes logic that interacts with the management service 116 to monitor and manage data, software components, and hardware components on the client device 106. The workspace configuration component 139 executed on the client device 106 can also install profiles containing device configuration information, such as virtual private network (VPN) configuration information, network authentication information, wireless network configuration, identity or security certificates that are installed on the device, or other configuration profiles.

The workspace management component 139 can also install applications on the client device 106 on behalf of the management service 116.

In some examples, the functionality of the workspace management component 139 can be embedded within the operating system 136 of the client device 106 and exposed to the management service 116 through APIs with which the management service 116 can interact. In other examples, the workspace management component 139 can be implemented as a part of functionality of a standalone application executed by the client device 106. For example, the client device 106 can execute a standalone application that facilitates management of the client device 106 by the management service 116 and enforcement of compliance policies that are sent to the client device 106 by the management service 116.

The data stored in the data store 114 can include one or more device records 123, user data 125, and potentially other data. A device record 123 can represent various security settings selected for enforcement on a client device 106 that is enrolled with the management service 116. Accordingly, a device record 123 can include a device identifier associated with a device, such as the client device 106, an indication of whether the device is a fully or partially managed device, a compliance status, a user associated with a particular device, and potentially other data. The device record 123 can also store other device specific information, such as whether a device is a user's personal device or a "BYOD" device. In some scenarios, an enterprise can require that a user enroll his or her personal device in order to access resources of the enterprise, such as email, documents, calendar data, applications, and other information. The device record 123 can also specify whether a client device 106 is a domain joined device, such as a device that belongs to or was issued by an enterprise. In this scenario, a client device 106 can be a computing device or a peripheral device, such as a printer, scanner, or other device that can be deployed in an environment and associated with a record in a directory service.

The device record 123 can also specify policies that can be enforced by the management service 116 or by the client device 106. For example, the device record 123 can identify other user specific or device specific policies that are associated with a particular client device 106, such as policies that are related to the location of the client device 106, network settings of the client device 106, applications that are installed on the client device 106, or any other properties associated with the configuration of the client device 106.

User data 125 contains information about users who are associated with client devices 106 that are enrolled with the management service 116. User data 125 can include profile information about a user, authentication information about a user, and other user information. For example, user data 125 can include information about client devices 106 that are associated with a user account of the user, enterprise resources to which a particular user has access, such as email, calendar data, documents, media, applications, network sites, or other resources. The user data 125 can also identify one or more user groups of which a particular user is a member, which can in turn define the access rights of the user to one or more enterprise resources as well as identify which applications should be deployed to a client device 106 associated with the user. To this end, the user data 125 can further identify one or more device identifiers that can uniquely identify client devices 106 that are associated with a user account of the user.

User data 117 can further include information about a user account that a user may have within the application distribution environment 109, which is an account that is external to the enterprise account. Information about the user account within the application distribution environment 109 may comprise a hash of the user's account identifier within the application distribution environment 109 or another identifier from which the user's account within the application distribution environment 109 can be identified.

Application data 127 can include information about various applications that can be deployed by the management service 116 to client devices 106 that are enrolled with the management service 116. An application profile 129 associated with a particular application identifies settings associated with the application and a parameter with which a setting should be populated when the application is deployed to a client device 106. The application profile 129 can identify various key-value pairs that specify a setting and a value for that setting. In some examples, a value for a particular setting within an application profile 129 can be a user-specific value that is retrieved from user data 125 or a device record 123 corresponding to the client device 106. In other examples, the value for a setting can be a hardcoded value that is specific a particular enterprise. Accordingly, when deploying an application, the management service 116 can deploy the application onto the client device 106 along with the settings for the application that are determined from the application profile 129 that corresponds to the application.

The client device 106 can execute an operating system 136, as well as other applications. As noted above, the operating system 136 can provide APIs that allow various workspaces to be established within the client device 106. These workspaces can be segmented into different areas of the device that can be managed differently by the operating system 136. For example, the operating system 136 can allow the client device 106 to be enrolled as a managed device with the management service 116. Upon enrollment of the client device 106 with the management service 116, the operating system 136 can create a separate workspace that is associated with the enrollment. The separate workspace can include data storage areas of the device that are managed by the management service 116. The management service 116 can also direct that applications be installed in the separate workspace or that certain configuration profiles be installed on the client device 106 and associated with the separate workspace. The workspace configuration component 139 represents APIs and logic that facilitates creation and management of the separate workspaces by the management service 116.

In this way, a user can enroll a BYOD device with the management service 116 and maintain separation between the areas of the device that are managed by the management service 116 and those that are not. For purposes of illustration and discussion, the client device 106 of FIG. 1 is assumed to be enrolled with the management service 116 so that separate workspaces are established on the client device 106 by the workspace configuration component 139 of the operating system 136. In the example of FIG. 1, the workspace configuration component 139 can establish a personal workspace 143 and an enterprise workspace 146. The enterprise workspace 146 can be established by the workspace configuration component 139 in response to enrollment of the client device 106 with the management service 116.

The enterprise workspace 146 can be managed by the management service through the workspace configuration component 139. In this sense, the management service 116 can deploy applications to the enterprise workspace 146 and issue management commands to the workspace configuration component 139 with respect to the enterprise workspace 146. Management commands can include commands to erase data from the enterprise workspace 146, remove certain applications, install applications, or otherwise alter the data in the enterprise workspace 146. Additionally, management commands can include commands to apply security policies or configuration profiles to the enterprise workspace 146.

In contrast, the personal workspace 143 can be an unmanaged portion of the client device 106 even though the device is enrolled with the management service 116. Accordingly, the workspace configuration component 139 can apply management commands only to the enterprise workspace 146 and not to the personal workspace 143.

The workspace configuration component 139 can also save application settings for applications that are installed in either workspace into a storage area of the client device 106 that is designated for application settings. In one example, the settings or preferences for a particular application can be stored as key-value pairs in a user preferences database that is maintained by the operating system 136. In some examples, each workspace can have its own respective user preferences database. In another example, the settings or preferences for applications installed on the client device 106 can be stored in a storage area that is allotted for respective application installations on the client device 106.

In the example of FIG. 1, a personal application 149 represents an application that is installed within the personal workspace 143, and an enterprise application 151 represents an application that is installed within the enterprise workspace 146. An enterprise application 151 can also be installed at the direction of the management service 116. For example, an administrator can identify one or more applications that should be installed within the enterprise workspace 146 of a client device 106 that is enrolled with the management service 116, and the workspace configuration component 139 can install the applications as enterprise applications 151. Installation of enterprise applications 151 is described in further detail below.

The application distribution environment 109 represents a computing environment that is accessible by client devices 106 and the enterprise computing environment 103 over the network 113. The application distribution environment 109 is a computing environment that corresponds to a publicly accessible application marketplace or repository from which the client device 106 can obtain and install applications. As an example, the application distribution environment 109 can represent the Google Play® Store. The application distribution environment 109 can execute an application distribution system 156, which can provide user authentication, payment processing, application licensing, and copies of applications to the client device 106 and to the management service 116.

The application distribution environment 109 can also include an application repository 159. The application repository 159 can be a data store that houses copies of applications 161 that are available for installation on client devices 106. Additionally, an application 161 can be retrieved by the management service 116 for analysis by the management service 116 to generate an application profile 129 that identifies the various settings that are associated with the application 161. An application 161 can also be associated with an application manifest 162. The application manifest 162 can identify various resources associated with the application 161, such as audio, video, images, or other files with which an application 161 is packaged. The application manifest 162 can also identify various application settings associated with the application 161. In one example, an application setting can be defined as a key-value pair that specifies a configuration option for the application 161. For example, an application setting can be a username, a server address, a reference to a security certificate, or any other parameter associated with a configuration of the application 161.

A user can purchase or initiate download of an application 161 through a user interface provided on the client device 106. The user interface can be generated by a special purpose application that is used to browse a marketplace in which applications, music and other content can be downloaded, rented or purchased from the application distribution system 156. The user interface can also be a browser-based user interface that is generated by the application distribution system 156. The application distribution system 156 can process payment for an application selected by the user, if necessary, and associate a license for the application 161 with the client device 106 or a user account of a user within the application distribution environment 109. In some scenarios, a user can initiate installation of an application 161 in a particular workspace on the client device 106. In other scenarios, the management service 116 can initiate installation of an application 161 on the client device 106 in the enterprise workspace 146 on behalf of a user. In other words, the management service 116 can deploy the application 161 on the client device 106 that is enrolled with the management service 116.

To facilitate deployment of applications 161, the management service 116 can allow an administrator to perform a discovery process with respect to an application 161. In the discovery process, the management service 116 discovers application settings associated with the application 161 and allows an administrator to identify parameters with which the various application settings should be populated when the application 161 is deployed to client devices 106. In one example, the management service 116 can obtain a copy of an application 161 from the application distribution system 156 and extract the application manifest 162 from the application 161. The management service 116 can then identify the key-value pairs within the application manifest 162 that correspond to respective application settings associated with the application 161. In one example, the management service 116 can identify keys that correspond to application settings, as the various application settings might be populated with null values before an application 161 is actually installed on a client device 106.

In some examples, rather than extracting the application manifest 162 to determine the application settings of the application 161, the management service 116 can submit a request to an API provided by the application distribution system 156 for information about the application settings associated with the application 161. The management service 116 can then generate an application profile 129 for the application 161 in response to receiving an identification of the application settings in response to the request submitted to the API.

Upon identifying the application settings associated with an application 161 from the application manifest 162, the management service 116 can generate an application profile 129 associated with the application 161 in the data store 114. The management service 116 can also prompt the administrator to define parameters for one or more of the application settings that are identified by the application manifest 163. The parameters can include user-specific parameters, such as a username, password, or email address. In this example, the parameter can be a reference to a particular value in a user profile or user data 125 associated with a user within the enterprise computing environment 103. In this scenario, the management service 116 can populate the application setting with the value from the user profile when the application is deployed to a client device 106 of the user. Accordingly, the application profile 129 can include a placeholder or a reference to a particular user profile value. In another example, the parameters corresponding to application settings in an application profile 129 can also include parameters that are constant for a group of users within the enterprise. The administrator can specify that a value for a particular application setting should be associated with a particular user group within the enterprise.

An application setting within an application profile 129 can also reference a security certificate associated with an application 161. In one example, an application 161 can rely upon a certificate that is installed on a client device 106 for authentication, security, or other purposes. Accordingly, the management service 116, when deploying an application 161 that relies upon a certificate, can also initiate a request to install the certificate on the client device 106. The management service 116 can install the certificate on the client device 106 using APIs provided by the workspace configuration component 139.

As another example, an application setting within an application profile 129 can rely upon a configuration profile, such as a VPN profile, that the management service 116 can install on the client device 106. Accordingly, the application profile 129 can include a reference to a VPN profile that is stored within the data store 114. The management service 116, when deploying the application 161 that references the VPN profile, can also deploy the VPN profile within the enterprise workspace 146 of the client device 106.

The administrator can also identify particular users, user groups, or client devices 106 that should be provisioned with an application 161. The application profile 129 can then include an indication of which users, user groups, or client devices 106 should be provisioned with the application 161. In one scenario, the application profile 129 can identify which client devices 106 should be provisioned with a corresponding application 161 by identifying a particular device type, operating system, or device manufacturer.

Accordingly, upon enrollment of a client device 106 with the management service 116 and establishment of the enterprise workspace 146 by the workspace configuration component 139, the management service 116 can deploy the applications 161 that are associated with a user associated with the enrollment or one or more properties of the client device 106. The management service 116 can initiate deployment of the applications 161 to the client device 106 using APIs provided by the workspace configuration component 139 or the application distribution system 156. In one scenario, the management service 116 can transmit a request that directs the workspace configuration component 139 to retrieve and install an application 161 that is associated with the user or the client device 106. In another scenario, the management service 116 can transmit a request that directs the application distribution system 156 to initiate installation of an application 161. In either scenario, the management service 116 can cause an application 161 to be installed within the enterprise workspace 146 that is managed by the management service 116.

The management service 116 can also populate settings for the installation of the application 161 by determining, from the application profile 129, which parameter values should be included in the installation of the application 161 on the client device 106. The management service 116 can deploy the application 161 with the settings from the application profile 129 pre-populated by relying upon APIs provided by the workspace configuration component 139 that allow the management service 116 to deploy an application and populate settings associated with the application 161 when the application 161 is installed as an enterprise application 151 in the enterprise workspace 146.

Figure 2:
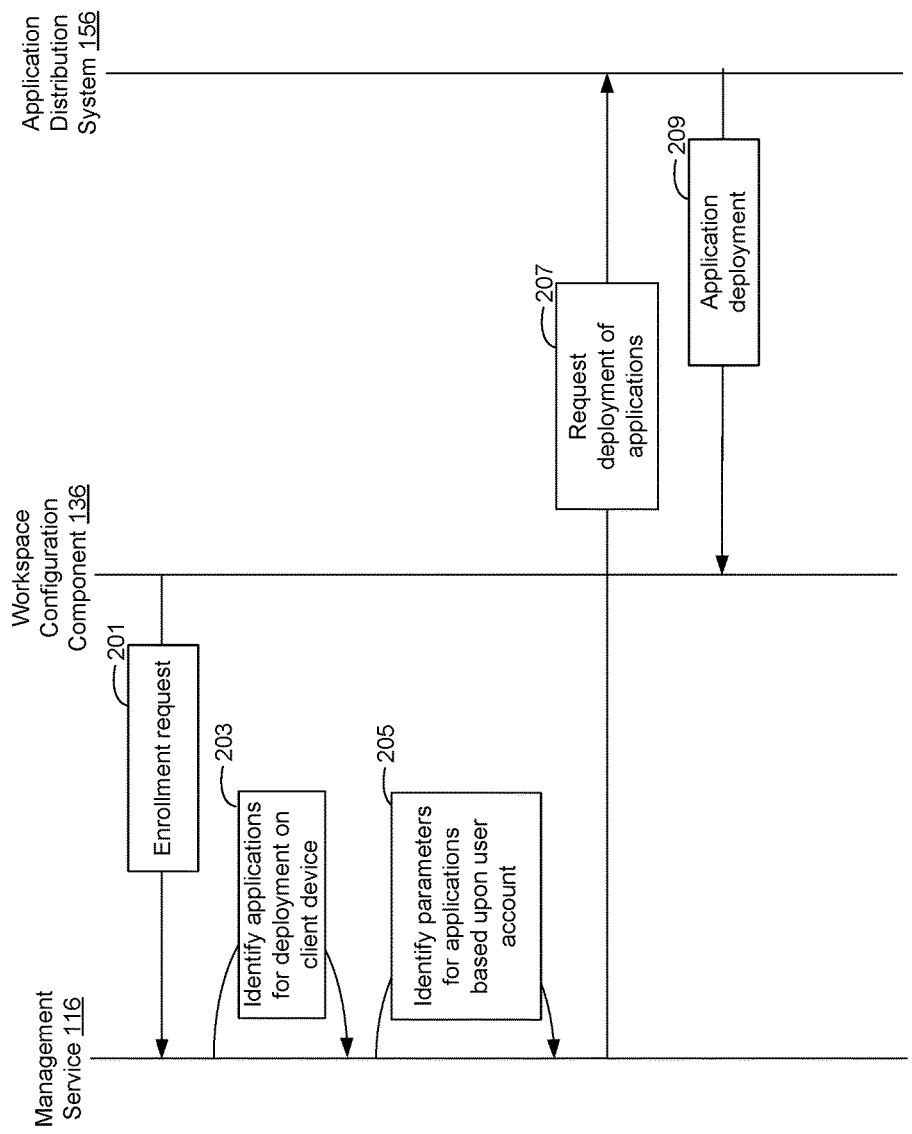
FIG. 2 is a sequence diagram depicting the operation of various examples of the disclosure in a networked environment.

Referring next to FIG. 2, shown is a sequence diagram that provides one example of interactions between components shown in the example networked environment 100 of FIG. 1. FIG. 2 illustrates an example of how the management service 116 can deploy applications 161 to a client device 106 along with application settings that are associated with the application 161. At step 201, the management service 116 can obtain a request to enroll a client device 106 with the management service 116. The request to enroll the client device 106 can be received from a workspace configuration component 136 executed by the client device 106. The request to enroll the client device 106 can include information about the client device 106, such as a device identifier, as well as information about the user, such as the user's credentials for the user's identity in the enterprise environment (e.g., an Active Directory® identity of the user). The management service 116 can authenticate the user's credentials as well as extract information about the device from the request. In one example, the request can include the operating system type and version, network address, physical location, or other parameters and variables about the client device 106 that can be populated into a device record 123.

At step 203, the management service 116 can identify one or more applications 161 that are designated for deployment on the client device 106. For example, an administrator can identify one or more applications 161 that are required for deployment on a client device 106 based upon device parameters of client device 106 or an identity of the user associated with the enrollment request. At step 205, the management service 116 can identify parameters associated with the applications 161 that are designated for deployment on the client device 106 based upon an application profile 129 that is associated with the application 161.

At step 207, the management service 116 can submit a request to an API provided by the application distribution system 156 to deploy the applications 161 on the client device 106. The request can identify the application settings with which the applications 161 should be configured when they are installed on the client device 106. At step 209, the application distribution system 156 can initiate deployment of the identified applications 161 by directing the workspace configuration component 136 to install the applications 161 as enterprise applications 151 along with the application settings that are specified by the management service 116 at step 207. In this way, the management service 116 can deploy the applications 161 to enrolled client devices 106 with application settings that are stored in an application profile 129 without intervention by the user of the client device 106.

Figure 3:
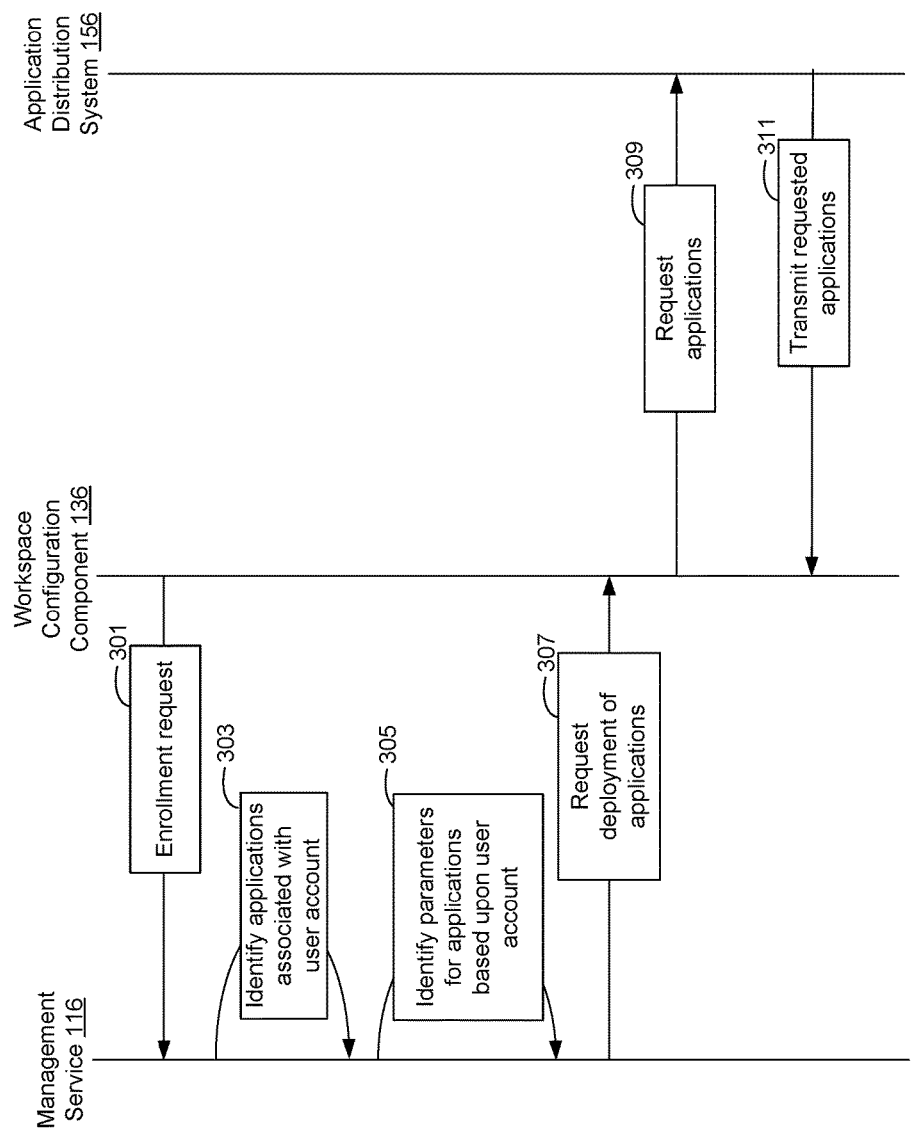
FIG. 3 is a sequence diagram illustrating one example of functionality according to various examples of the disclosure.

Referring next to FIG. 3, shown is a sequence diagram that provides one example of interactions between components shown in the example networked environment 100 of FIG. 1. FIG. 3 illustrates an alternative example of how the management service 116 can deploy applications 161 to a client device 106 along with application settings that are associated with the respective applications 161. At step 301, the management service 116 can obtain a request to enroll a client device 106 with the management service 116. At step 303, the management service 116 can identify one or more applications 161 that are designated for deployment on the client device 106. At step 305, the management service 116 can identify parameters associated with the applications 161 that are designated for deployment on the client device 106 based upon an application profile 129 that is associated with the respective applications 161.

At step 307, the management service 116 can submit a request to an API provided by the workspace configuration component 136 to deploy the applications 161 on the client device 106. The request can identify the application settings with which the applications 161 should be configured when they are installed on the client device 106. At step 309, the workspace configuration component 136 can request the applications 161 from the application distribution system 156. In some examples, the management service 116 can also communicate information about licensing of the application 161 with the workspace configuration component 136 or the application distribution system 156 so that the application distribution system 156 can assign a license for a deployed application 161 to the client device 106 on behalf of the management service 116 or an enterprise associated with the management service 116.

At step 311, the application distribution system 156 can transmit the requested applications 161 to the workspace configuration component 136 if the user or client device 106 has been associated with a license for the respective applications 161. The workspace configuration component 136 can install the applications as enterprise applications 151 in the enterprise workspace 146. The enterprise applications 151 installed by the workspace configuration component 136 can also be provisioned with the application settings that were submitted to the workspace configuration component 136 by the management service 116. In this way, the applications 161 can be deployed by the management service 116 to enrolled client devices 106 and provisioned with settings that are contained within the application profile 129 for the application 161 without intervention by the user of the client device 106.

Figure 4:
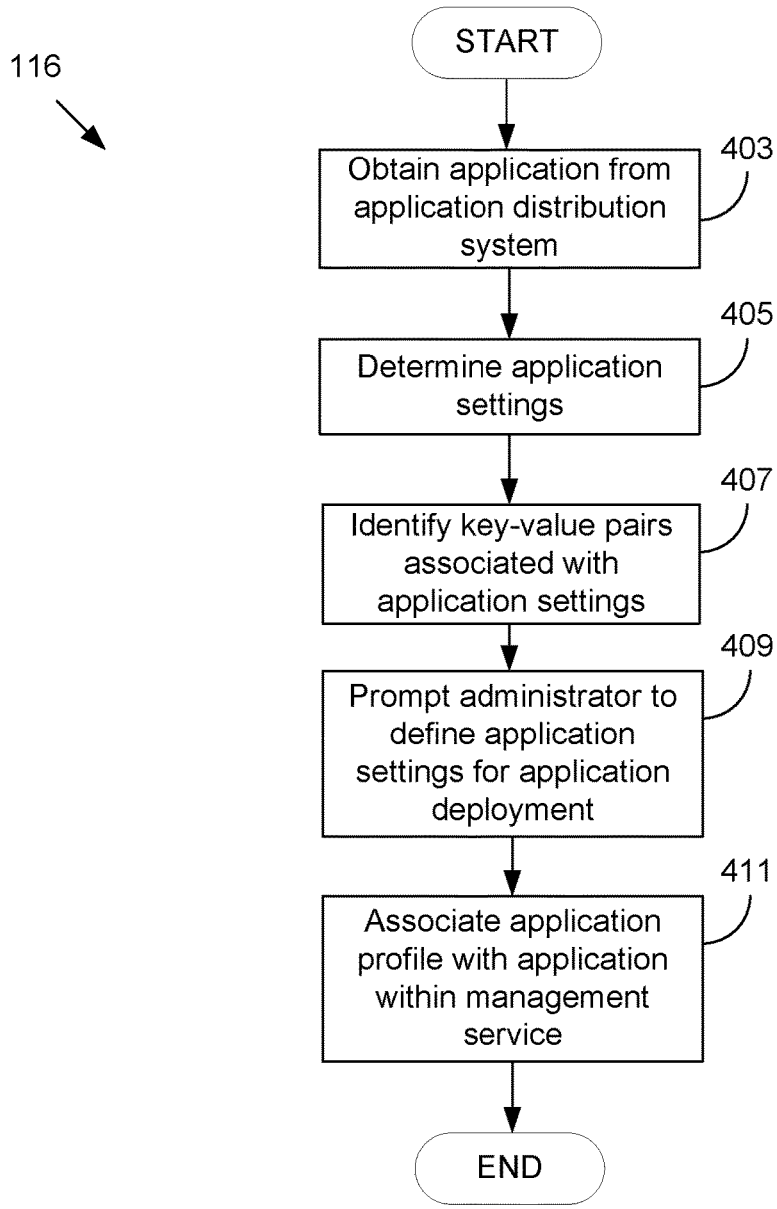
FIG. 4 is a flowchart illustrating one example of functionality implemented in a client device according to various examples of the disclosure.

Referring next to FIG. 4, shown is a flowchart that provides one example of the operation of a portion of the management service 116. As an alternative, the flowchart of FIG. 4 can be viewed as depicting an example of elements of a method implemented in the enterprise computing environment 103. FIG. 4 illustrates how the management service 116 can perform a discovery process that obtains an application 161 and generates an application profile 129 that corresponds to the application 161. The application profile 129 can facilitate later deployment of the application 161 to client devices by identifying the parameters with which various application settings should be populated.

First, at step 403, the management service 116 can obtain a copy of an application 161 from the application distribution system 156. The copy of the application 161 can be analyzed to determine application settings that can be included in an application profile 129 for the application 161. At step 405, the management service 116 can determine application settings that correspond to the application 161. In one example, the management service 116 can extract the application settings for the application 161 from an application manifest 162. In another example, the management service 116 can query the application settings corresponding to the application 161 by submitting a request to an API provided by the application distribution system 156. At step 407, the management service 116 can identify one or more key-value pairs that are associated with the application settings corresponding to the application settings.

After determining the application settings that are associated with the application 161, at step 409, the management service 116 can prompt an administrator of the enterprise computing environment 103 or the management service 116 to define parameters that should be used to populate one or more of the application settings when the application 161 is deployed to a client device 106. In one example, a parameter can include a user-specific parameter that is obtained from a user profile of a user. In another example, a parameter can include a reference to a security certificate or a configuration profile that the management service 116 can deploy onto a client device 106. The application settings that are associated with a parameter value by the administrator can be associated with an application profile 129 for the application 161.

At step 411, the management service 116 can associate the application profile 129 with the application 161 in the data store 114. As noted above, the application settings defined by the application profile 129 can be used to provision the application 161 for users of the client device 106 when an application 161 is deployed to an enterprise workspace 146 of an enrolled client device 106 as an enterprise application 151. In this way, an application 161 can be installed on the client device 106 already provisioned with the application settings that are identified by the application profile 129 without user intervention. Thereafter, the process proceeds to completion.

The sequence diagram of FIGS. 2-3 and the flowchart of FIG. 4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although sequence diagram of FIGS. 2-3 and the flowchart of FIG. 4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages might be added to the logical flow described herein, for purposes of enhanced utility, accounting, performance measurement, or troubleshooting aid. It is understood that all such variations are within the scope of the present disclosure.

The enterprise computing environment 103, the client device 106, or other components described herein can each include at least one processing circuit. Such a processing circuit can include one or more processors and one or more storage devices that are coupled to a local interface. The local interface can include a data bus with an accompanying address/control bus or any other suitable bus structure.

The one or more storage devices for a processing circuit can store data or components that are executable by the one or processors of the processing circuit. The management service 116 or other components can be stored in one or more storage devices and be executable by one or more processors. Also, a data store, such as the data store 114 or the client data store 143, can be stored in the one or more storage devices.

The management service 116, the management component 136, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A computer-implemented method comprising:
    obtaining, by a management service, an application from an application distribution system, the application associated with at least one key-value pair identifying at least one application setting of the application, the at least one application setting comprising a reference to a security certificate and a server address;
    defining, by the management service, an application profile associated with the application based upon the at least one key-value pair;
    associating, by the management service, the application profile with the application;
    obtaining, by the management service, a request to deploy the application to a client device associated with a user;
    initiating, by the management service, deployment of the security certificate on the client device, wherein the security certificate uniquely identifies a particular user associated with the application; and
    initiating, by the management service, deployment of the application to a particular workspace of the client device, wherein the application is deployed with a parameter identifying the security certificate and a parameter identifying the server address populated within an application setting from the application profile.

2. The computer-implemented method of claim 1, wherein initiating deployment of the security certificate on the client device further comprises instructing a management component executed by the client device to retrieve and install the security certificate.

3. The computer-implemented method of claim 2, wherein the security certificate authenticates a user identity of the user to at least one of the application or a service accessible by the application.

4. The computer-implemented method of claim 1, wherein deployment of the application is initiated by a management service that is executed remotely from the client device and remotely from the application distribution system.

5. The computer-implemented method of claim 4, wherein the parameter associated with the user is based upon a user profile accessible by the management service, wherein the user profile is separate from a respective user profile of the user in the application distribution system.

6. The computer-implemented method of claim 1, wherein the particular workspace of the client device is managed by a management service and the client device is associated with another workspace that is not managed by the management service.

7. A non-transitory computer-readable medium embodying a program executed by a computing device, wherein the program is configured to cause the computing device to at least:
    obtain an application from an application distribution system, the application associated with at least one key-value pair identifying at least one application setting of the application, the at least one application setting comprising a reference to a security certificate and a server address;
    define an application profile associated with the application based upon the at least one key-value pair;
    associate the application profile with the application;
    obtain a request to deploy the application to a client device associated with a user;
    initiate deployment of a security certificate on the client device, wherein the security certificate uniquely identifies a particular user associated with the application; and
    initiate deployment of the application to a particular workspace of the client device, wherein the application is deployed with a parameter identifying the security certificate and a parameter identifying the server address populated within an application setting from the application profile.

8. The non-transitory computer-readable medium of claim 1, wherein the program initiates deployment of the security certificate on the client device by instructing a management component executed by the client device to retrieve and install the security certificate.

9. The non-transitory computer-readable medium of claim 8, wherein the security certificate authenticates a user identity of the user to at least one of the application or a service accessible by the application.

10. The non-transitory computer-readable medium of claim 7, wherein deployment of the application is initiated by a management service that is executed remotely from the client device and remotely from the application distribution system.

11. The non-transitory computer-readable medium of claim 10, wherein the parameter associated with the user is based upon a user profile accessible by the management service, wherein the user profile is separate from a respective user profile of the user in the application distribution system.

12. The non-transitory computer-readable medium of claim 7, wherein the particular workspace of the client device is managed by a management service and the client device is associated with another workspace that is not managed by the management service.

13. A system comprising:
at least one computing device; and
a management service executable by the at least one computing device, wherein the management service causes the at least one computing device to at least:
 obtain an application from an application distribution system, the application associated with at least one key-value pair identifying at least one application setting of the application, the at least one application setting comprising a reference to a security certificate and a server address;
 define an application profile associated with the application based upon the at least one key-value pair;
 associate the application profile with the application;
 obtain a request to deploy the application to a client device associated with a user;
 initiate deployment of the security certificate on the client device, wherein the security certificate uniquely identifies a particular user associated with the application; and
 initiate deployment of the application to a particular workspace of the client device, wherein the application is deployed with a parameter identifying the security certificate and a parameter identifying the server address populated within an application setting from the application profile.

14. The system of claim 13, wherein the management service initiates deployment of the security certificate on the client device by instructing a management component executed by the client device to retrieve and install the security certificate.

15. The system of claim 13, wherein deployment of the application is initiated by a management service that is executed remotely from the client device and the application distribution system.

16. The system of claim 15, wherein the parameter associated with the user is based upon a user profile accessible by the management service, wherein the user profile is separate from a respective user profile in the application distribution system.

17. The system of claim 13, wherein the particular workspace of the client device is managed by a management service and the client device is associated with another workspace that is not managed by the management service.

* * * * *